Jan. 2, 1923.

R. P. HOWARD.
POULTRY FEEDER.
FILED APR. 18, 1922.

1,440,875

Inventor
Rufus P. Howard
by Harry Cohen
Attorney

Patented Jan. 2, 1923.

1,440,875

UNITED STATES PATENT OFFICE.

RUFUS P. HOWARD, OF GLEN FLORA, WISCONSIN.

POULTRY FEEDER.

Application filed April 18, 1922. Serial No. 555,465.

*To all whom it may concern:*

Be it known that I, RUFUS P. HOWARD, a citizen of the United States, residing at Glen Flora, in the county of Rusk and State of Wisconsin, have invented certain new and useful Improvements in Poultry Feeders, of which the following is a specification.

This invention relates to a poultry feeding device and has for its principal object the provision of a device comprising a reservoir for food where poultry may eat whenever they so desire.

Another object of the invention is to provide a feeder that will maintain the food in proper condition until consumed and which will keep the food from being reached by mice, rats or vermin.

A further object of this invention is to provide a feeder having openings through which the grain is picked by the poultry, said openings being variable in size to suit feed of various kinds.

For a more complete understanding of this invention reference is to be had to the following description and the accompanying drawing in which.

Figure 1:
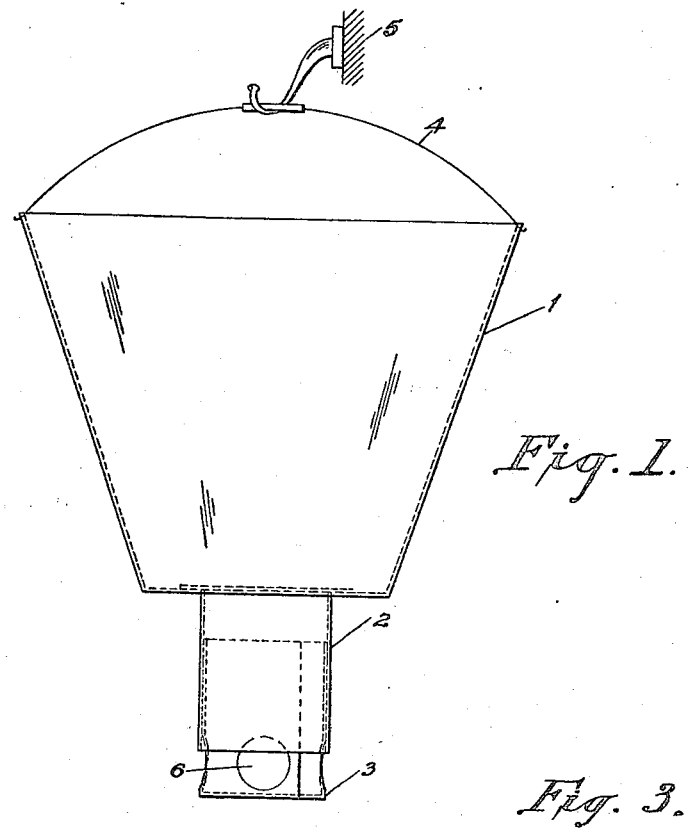
Fig 1 is a side elevation of the feeder.
Figure 2:
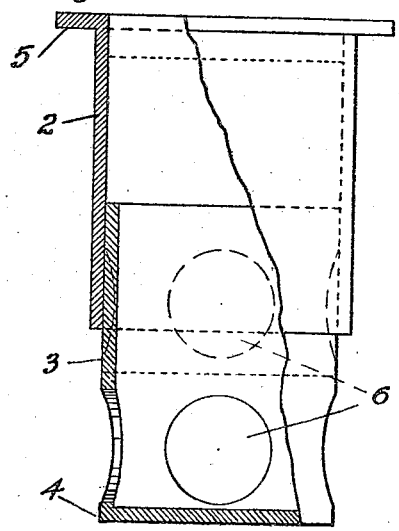
Fig. 2 is a side elevation and part sectional view of the telescoping members constituting the feed outlet of the device.
Figure 3:
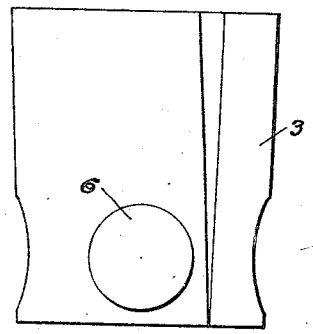
Fig. 3 is a side elevation of the telescoping member having the outlet openings.

Referring to the drawings it will be seen that the feeder comprises the reservoir 1 and the telescoping parts 2 and 3, the reservoir 1 being provided with the handle 4 enabling the feeder to be suspended from the hook 5 at a suitable distance from the ground or floor and away from the walls of the coop or enclosure.

The reservoir has an opening in the bottom thereof through which extends the cylindrical member 2 which depends from the bottom of the reservoir 1 being supported thereon by the annular flange 5 which is shown integral with the cylindrical member 2.

The part 3 cooperating with the cylindrical part 2 to constitute the feeding outlet for the grain or other food is provided with the openings 6 through the grain is picked by the poultry. The part 3 is split longitudinally thereof, as shown, so that there is provided an annular spring-like sliding fit between the cooperating members 2 and 3 to enable said parts to be readily adjusted longitudinally with respect to each other for the purpose of varying the size of the openings 6 so that it is possible to regulate the approximate amount of grain or other food that can be picked by the poultry. It is obvious that the same result may be accomplished by likewise providing the member 2 with similar openings near the bottom thereof which in cooperation with the openings 6 may operate to control the feed outlets. It will be obvious that when food of coarse and preferably granular nature is placed in the reservoir, some of it will flow through the openings to the ground and will be eaten by the poultry. However, due to the nature of the food and the regulated size of the openings, only a small quantity will reach the ground. Then the poultry will begin to pick the food from the feeder through the openings and another small quantity will fall to the ground and this process will be continued as long as the poultry continue to eat.

From the above description it will be obvious that there is provided an exceedingly simple device that may be cheaply constructed from sheet metal or other suitable material. The number of parts are few and are easily kept in a clean and sanitary condition.

While I have shown and described my invention in the best embodiment thereof, it will be understood that minor changes may be made without departing from the scope of the invention as defined by the appended claims.

Having thus described my invention, what I claim and desire to secure by Letters Patent of the United States is:

1. A poultry feeder comprising a reservoir having an opening in its bottom, a cylindrical member extending through said opening and provided with an annular flange adapted to rest on the bottom of the reservoir to thereby support the cylindrical member, and a cylindrical member closed at its bottom and provided with openings near the bottom in sliding engagement with said first mentioned cylindrical member for the purpose described, said second mentioned cylinder being smaller in cross section throughout its length than said first mentioned cylinder.

2. In a poultry feeder, two telescoping members in sliding contact with each other, one of said members having means adapting it to be supported above the ground, and the other member having openings near its bottom for the passage of feed therethrough, said second mentioned telescoping member being smaller in cross section throughout its length than said first mentioned telescoping member.

3. In a poultry feeder, two telescoping members, one of said members having means adapting it to be supported above the ground and the other member being split longitudinally thereof and being slidable with a spring fit within the other member, said second member being provided with holes near its bottom, said second mentioned telescoping member being smaller in cross section throughout its length than said first mentioned telescoping member.

In witness whereof, I hereunto affix my signature.

RUFUS P. HOWARD.